(12) United States Patent
Hensel

(10) Patent No.: US 6,439,534 B1
(45) Date of Patent: Aug. 27, 2002

(54) RECIPE HOLDER SYSTEM

(76) Inventor: Ronald F. Hensel, 7384 Lighthouse St., Englewood, FL (US) 34224

( * ) Notice: Subject to any disclaimer, the term of this patent is extended or adjusted under 35 U.S.C. 154(b) by 0 days.

(21) Appl. No.: 09/753,736

(22) Filed: Jan. 2, 2001

(51) Int. Cl.[7] .......................... A47B 19/00; A47B 23/00; A47B 23/04; A47B 97/00; A47F 5/00
(52) U.S. Cl. ................ 248/447.1; 248/452; 248/441.1; 248/301
(58) Field of Search .............................. 248/447.1, 452, 248/301, 441.1, 222.2, 245, 209, 459; 281/51, 45

(56) References Cited

U.S. PATENT DOCUMENTS

| | | | |
|---|---|---|---|
| 2,254,832 A | 9/1941 | Weight | 248/454 |
| 2,979,120 A * | 4/1961 | Amburn | 155/188 |
| 3,099,101 A | 7/1963 | Burris | 248/454 |
| 4,033,652 A | 7/1977 | O'Brien | 312/245 |
| 4,269,381 A * | 5/1981 | Harms | 248/222.2 |
| 4,369,948 A * | 1/1983 | Krauss | 248/441 |
| 4,403,761 A * | 9/1983 | Jamar | 248/441 |
| 4,460,145 A | 7/1984 | Ando | 248/447 |
| 4,511,111 A | 4/1985 | Godfrey et al. | 248/459 |
| 4,918,848 A * | 4/1990 | Stein | 40/584 |
| 4,974,805 A * | 12/1990 | Douglas | 248/447.1 |
| D316,727 S * | 5/1991 | Greenspahn | D19/52 |
| D325,401 S * | 4/1992 | Garfinkle | D20/43 |
| 5,272,826 A * | 12/1993 | Gingras | 40/642 |
| 5,636,869 A * | 6/1997 | Holmes | 281/45 |
| D381,212 S * | 7/1997 | Pagano | D6/300 |
| 5,709,365 A | 1/1998 | Howard | 248/454 |
| D393,237 S * | 4/1998 | Mondo | D12/177 |
| 5,797,631 A * | 8/1998 | Lander | 281/42 |
| 5,955,170 A * | 9/1999 | Davis | 428/81 |
| 6,126,125 A * | 10/2000 | Dalton | 248/205.2 |
| 6,152,416 A * | 11/2000 | Jacob | 248/441.1 |

* cited by examiner

Primary Examiner—Leslie A. Braun
Assistant Examiner—Amy Sterling
(74) Attorney, Agent, or Firm—Michael S. Neustel

(57) ABSTRACT

A recipe holder system for supporting a recipe document at eye level for a user during cooking. The recipe holder system includes a main body having a lower surface and an upper surface, a clip member attached to the main body, a vertical member extending upwardly from an upper end of the main body, and a horizontal member extending orthogonally from the vertical member. The vertical member and the horizontal member are formed for being received between the front lip and the lower edge of a door of a cabinet.

20 Claims, 9 Drawing Sheets

RECIPE HOLDER SYSTEM

BACKGROUND OF THE INVENTION

1. Field of the Invention

The present invention relates generally to recipe holders and more specifically it relates to a recipe holder system for supporting a recipe document at eye level for a user during cooking.

2. Description of the Prior Art

Recipe holding devices have been in use for years. Typically, a recipe holder is a support stand that is positioned upon the countertop of cabinetry and supports a recipe document at a vertical angle. The main problem with these type of recipe holders is that they require the user to tilt their head downwardly to view the recipe. Another problem with conventional recipe holders is that the eyes of the user are at a significant distance from the recipe making it difficult to read the recipe.

Examples of patented document holding devices which are illustrative of such prior art include U.S. Pat. No. 4,269,381 to Harms; U.S. Pat. No. 4,033,652 to O'Brien; U.S. Pat. No. 4,460,145 to Ando; U.S. Pat. No. 4,511,111 to Godfrey et al; U.S. Pat. No. 5,955,170 to Davis et al; U.S. Pat. No. 5,709,365 to Howard; U.S. Pat. No. 3,099,101 to Burris; U.S. Pat. No. 2,254,832 to Weight.

While these devices may be suitable for the particular purpose to which they address, they are not as suitable for supporting a recipe document at eye level for a user during cooking. Conventional recipe holders do not provide a convenient method for supporting a recipe document at eye level for a user.

In these respects, the recipe holder system according to the present invention substantially departs from the conventional concepts and designs of the prior art, and in so doing provides an apparatus primarily developed for the purpose of supporting a recipe document at eye level for a user during cooking.

SUMMARY OF THE INVENTION

In view of the foregoing disadvantages inherent in the known types of recipe holders now present in the prior art, the present invention provides a new recipe holder system construction wherein the same can be utilized for supporting a recipe document at eye level for a user during cooking.

The general purpose of the present invention, which will be described subsequently in greater detail, is to provide a new recipe holder system that has many of the advantages of the recipe holders mentioned heretofore and many novel features that result in a new recipe holder system which is not anticipated, rendered obvious, suggested, or even implied by any of the prior art recipe holders, either alone or in any combination thereof.

To attain this, the present invention generally comprises a main body having a lower surface and an upper surface, a clip member attached to the main body, a vertical member extending upwardly from an upper end of the main body, and a horizontal member extending orthogonally from the vertical member. The vertical member and the horizontal member are formed for being received between the front lip and the lower edge of a door of a cabinet.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a recipe holder system that will overcome the shortcomings of the prior art devices.

A second object is to provide a recipe holder system for supporting a recipe document at eye level for a user during cooking.

Another object is to provide a recipe holder system that is supported by a cabinet door.

An additional object is to provide a recipe holder system that allows a user to comfortably view and read a recipe document.

A further object is to provide a recipe holder system that positions the recipe document away from the cooking area.

Another object is to provide a recipe holder system that keeps a recipe document free from debris and damage.

Another object is to provide a recipe holder system that is compact in size to allow positioning of the holder within a conventional recipe box during storage.

A further object is to provide a recipe holder system that does not require a center vertical post within the cabinet to be properly supported.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
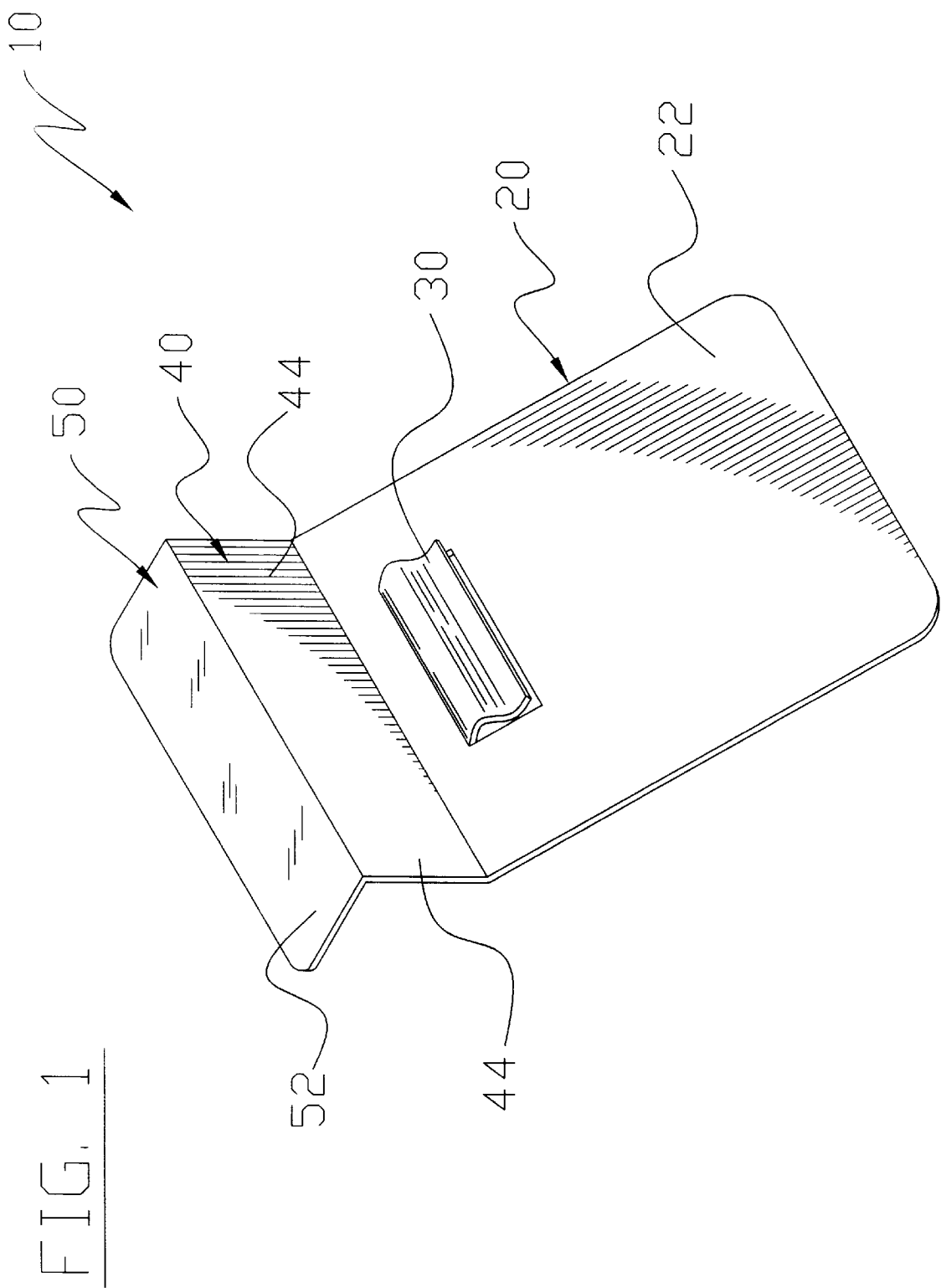
FIG. 1 is an upper perspective view of the present invention.
Figure 2:
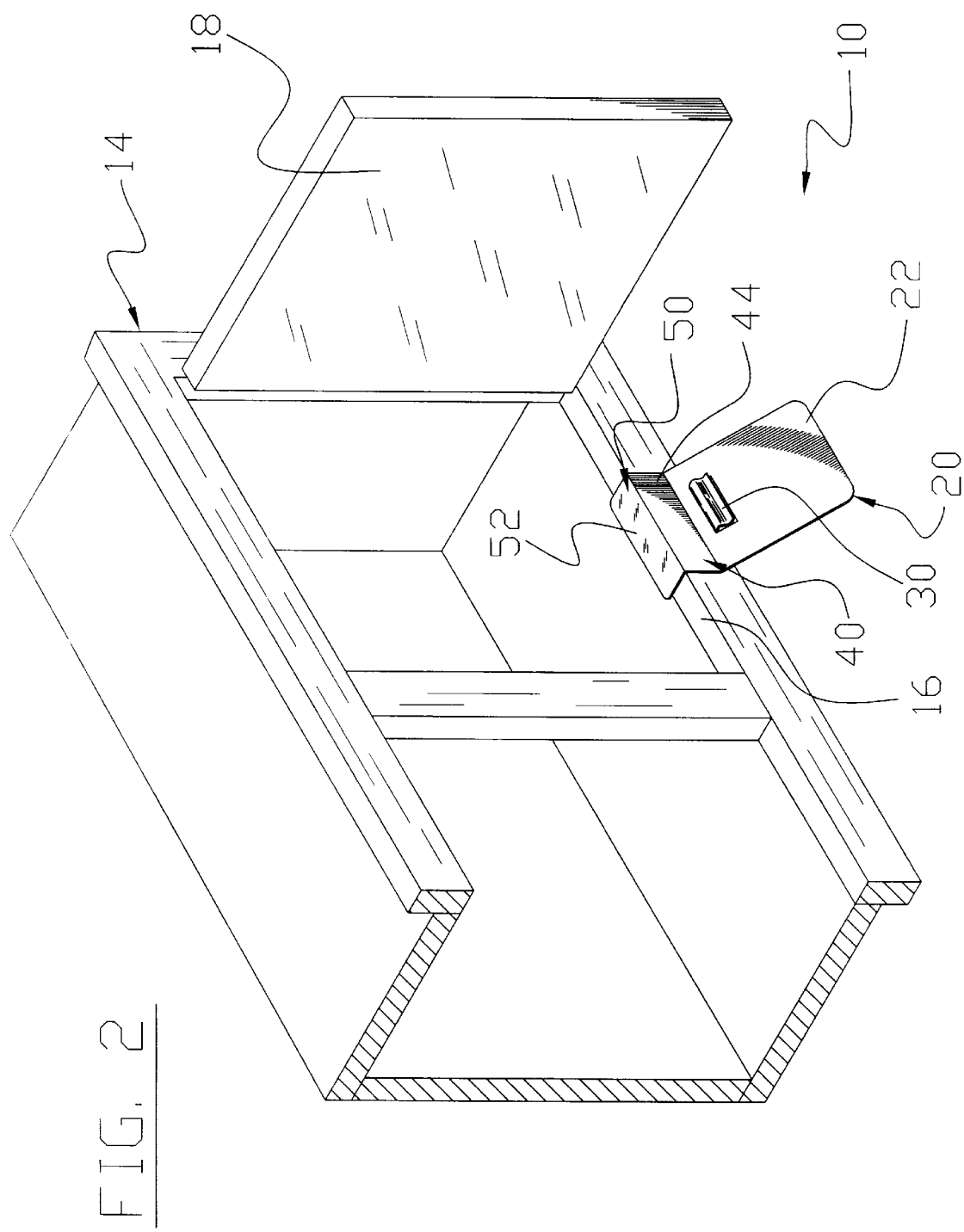
FIG. 2 is an upper perspective view of the present invention being positioned within a cabinet with the door open.

Turning now descriptively to the drawings, in which similar reference characters denote similar elements throughout the several views, FIGS. 1 through 9 illustrate a recipe holder system 10, which comprises a main body 20 having a lower surface 24 and an upper surface 22, a clip member 30 attached to the main body 20, a vertical member 40 extending upwardly from an upper end of the main body 20, and a horizontal member 50 extending orthogonally from the vertical member 40. The vertical member 40 and the horizontal member 50 are formed for being received between the front lip 16 and the lower edge of a door 18 of a cabinet 14.

Figure 3:
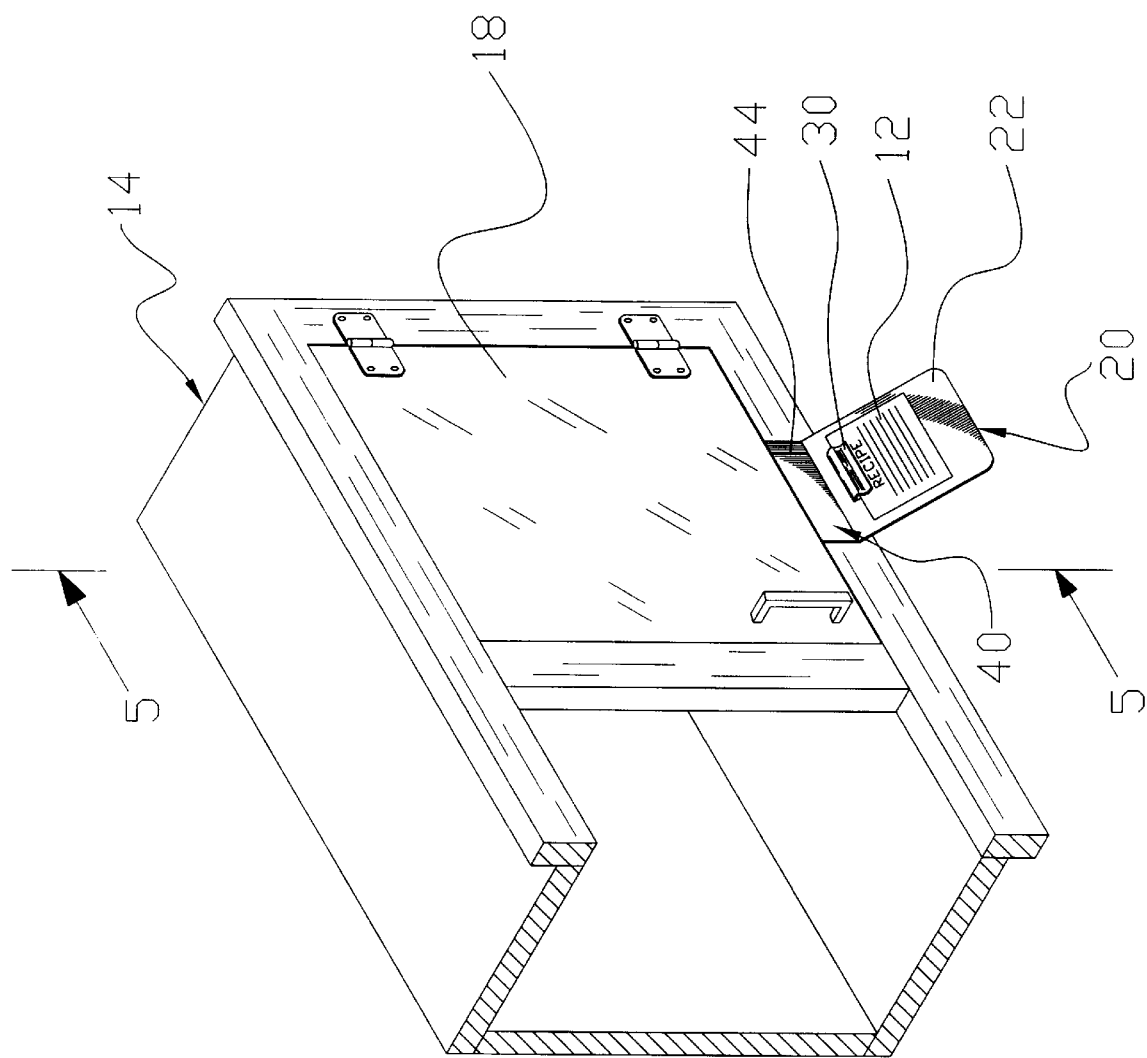
FIG. 3 is an upper perspective view of the present invention being positioned within a cabinet with the door closed.
Figure 4:
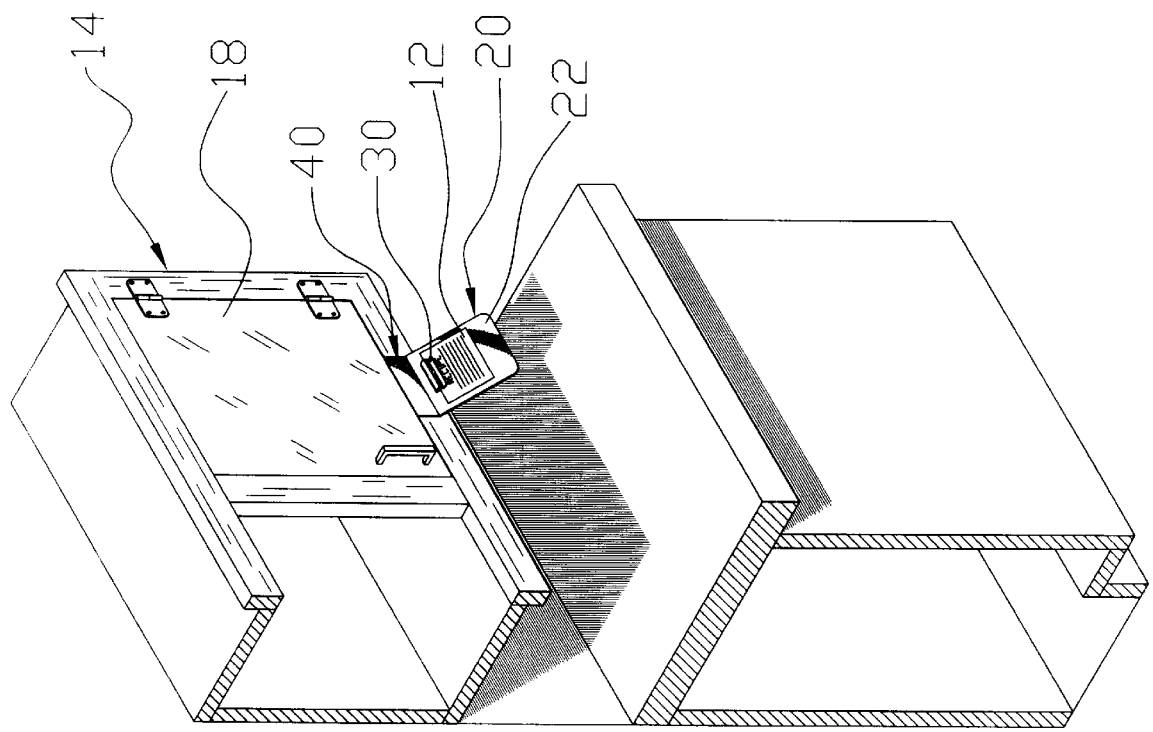
FIG. 4 is an upper perspective view of the present invention being positioned within a cabinet with the door closed.
Figure 5:
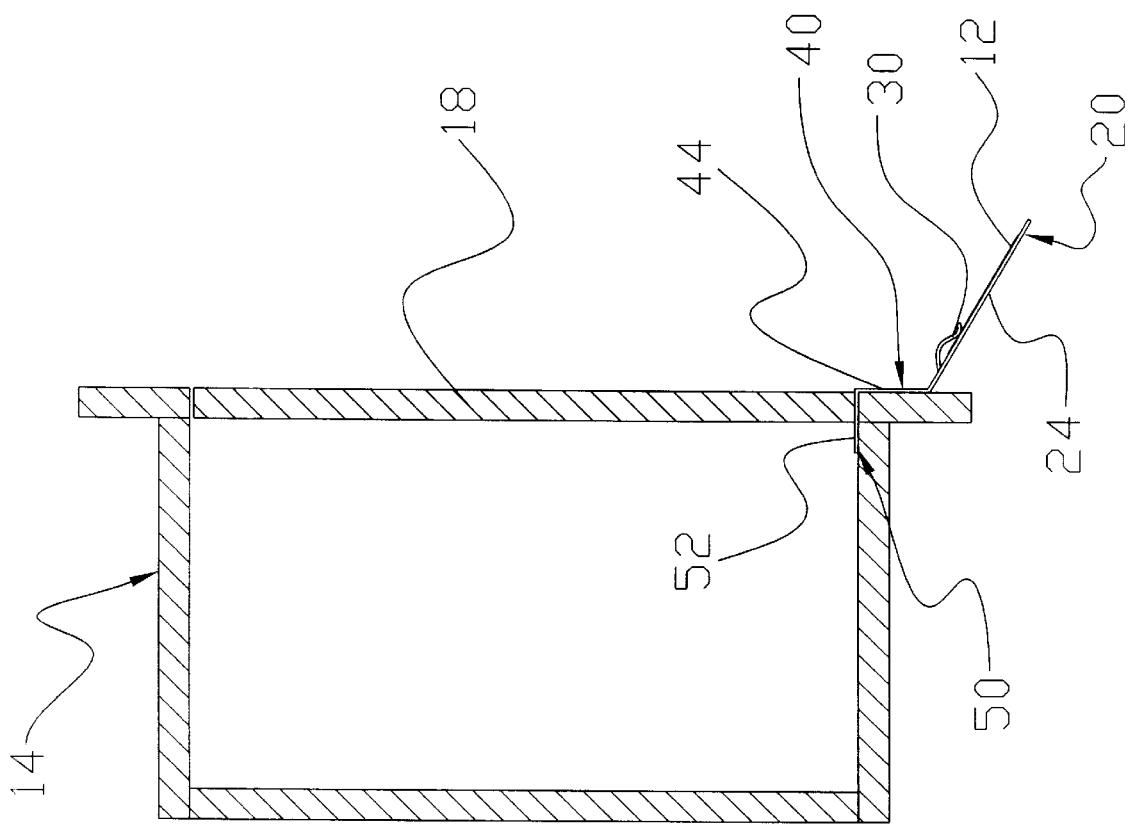
FIG. 5 is a cross sectional view taken along line 5—5 of FIG. 3 showing the horizontal member trapped between the door and the front lip of an older style cabinet.
Figure 9:
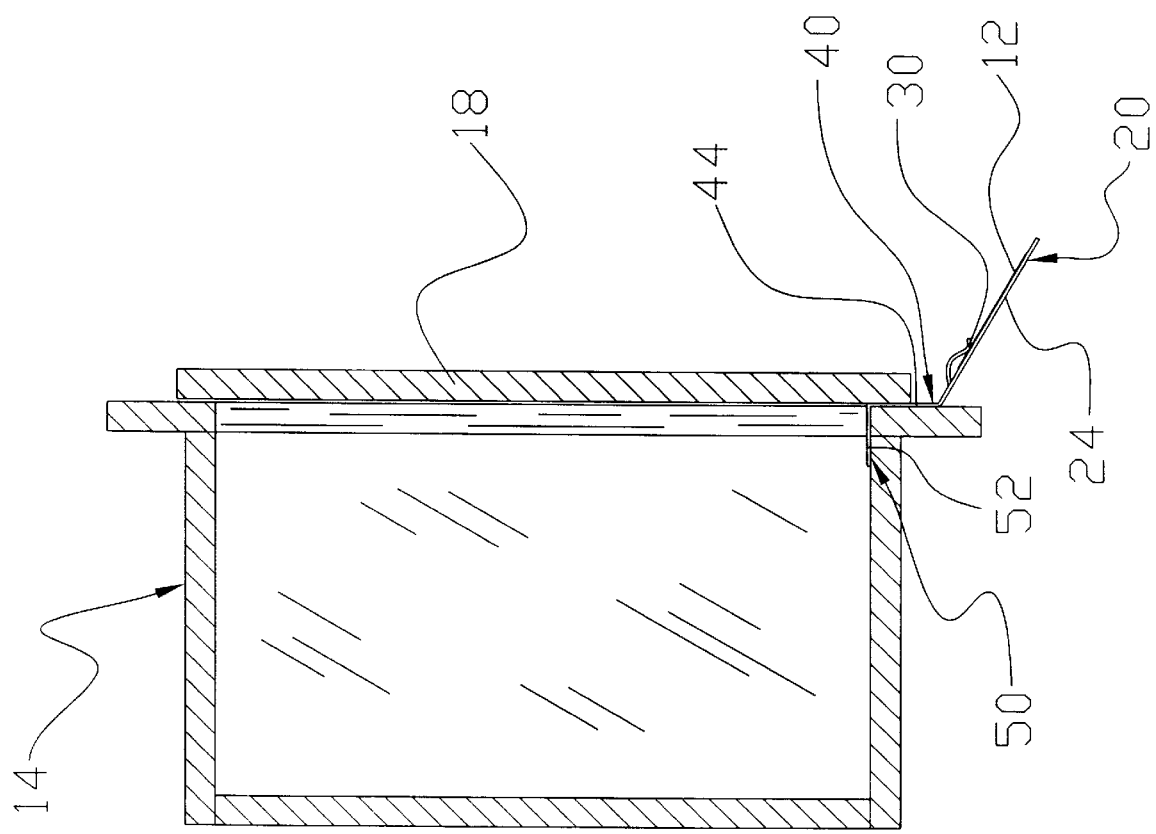
FIG. 9 is a side cutaway view showing the horizontal member trapped between the door and the front lip of a modern cabinet.

As shown in FIGS. 2 through 5 of the drawings, a conventional cabinet 14 is comprised of a frame structure having a front lip 16 and a pivotally attached door 18. The lower edge of the door 18 is positioned adjacent and above the front lip 16 of the cabinet 14 when closed as shown in FIGS. 3 and 5 of the drawings. Some cabinets 14 have center vertical posts and others do not utilize center vertical posts for adding support to the shelving and the doors 18. In some cabinet 14 designs, the door 18 engages the front surface of the front lip 16 of the cabinet 14 instead of being positioned above the front lip 16 as illustrated in FIG. 9 of the drawings. It can be appreciated that the present invention may be utilized upon cabinets 14 of various constructions and structures not illustrated within the drawings.

As shown in FIGS. 1 through 8 of the drawings, the main body 20 is formed into a relatively broad and flat structure. The main body 20 is preferably constructed of a lightweight material such as but not limited to plastic. The main body 20 may be constructed of various construction methods and systems.

Figure 7:
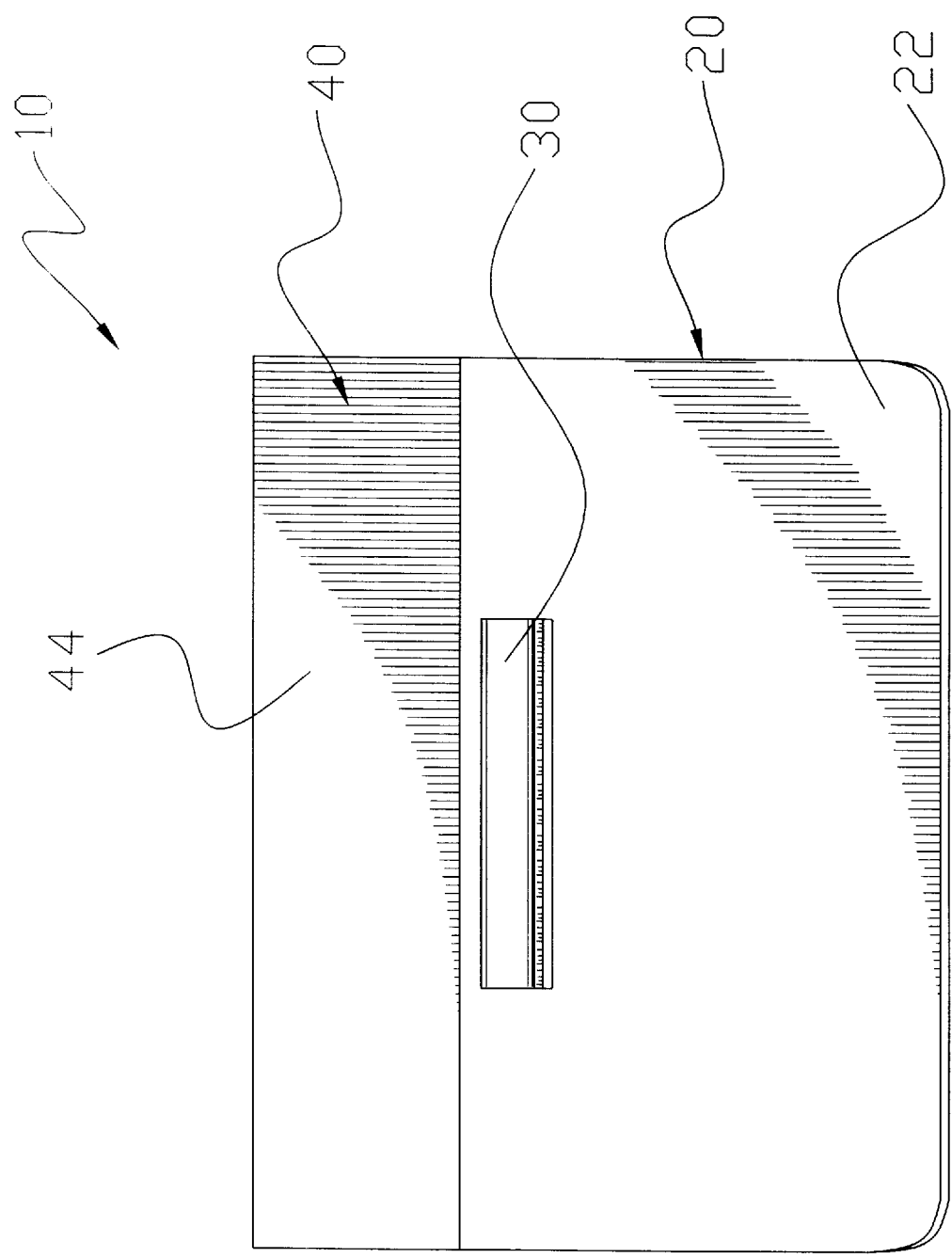
FIG. 7 is a front view of the present invention.
Figure 8:
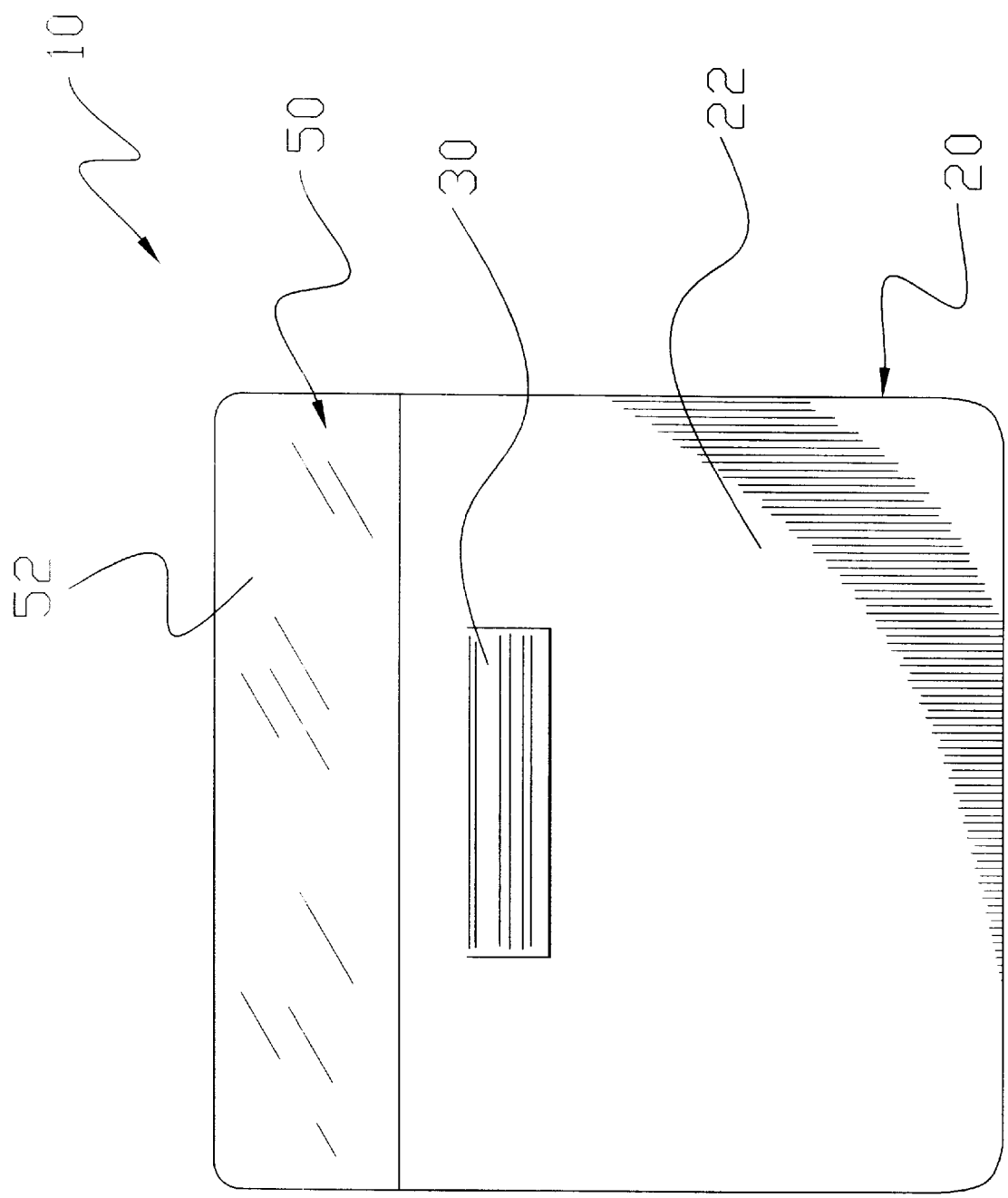
FIG. 8 is a top view of the present invention.

As best shown in FIGS. 1, 7 and 8 of the drawings, the main body 20 is preferably rectangular shaped having an upper surface 22 and a lower surface 24 in opposition to one another. The main body 20 further has an upper end and a lower end which are preferably narrower than the side edges of the main body 20. The lower corners of the main body 20 are preferably rounded to prevent injury to the user as shown in FIGS. 7 and 8 of the drawings.

Figure 6:
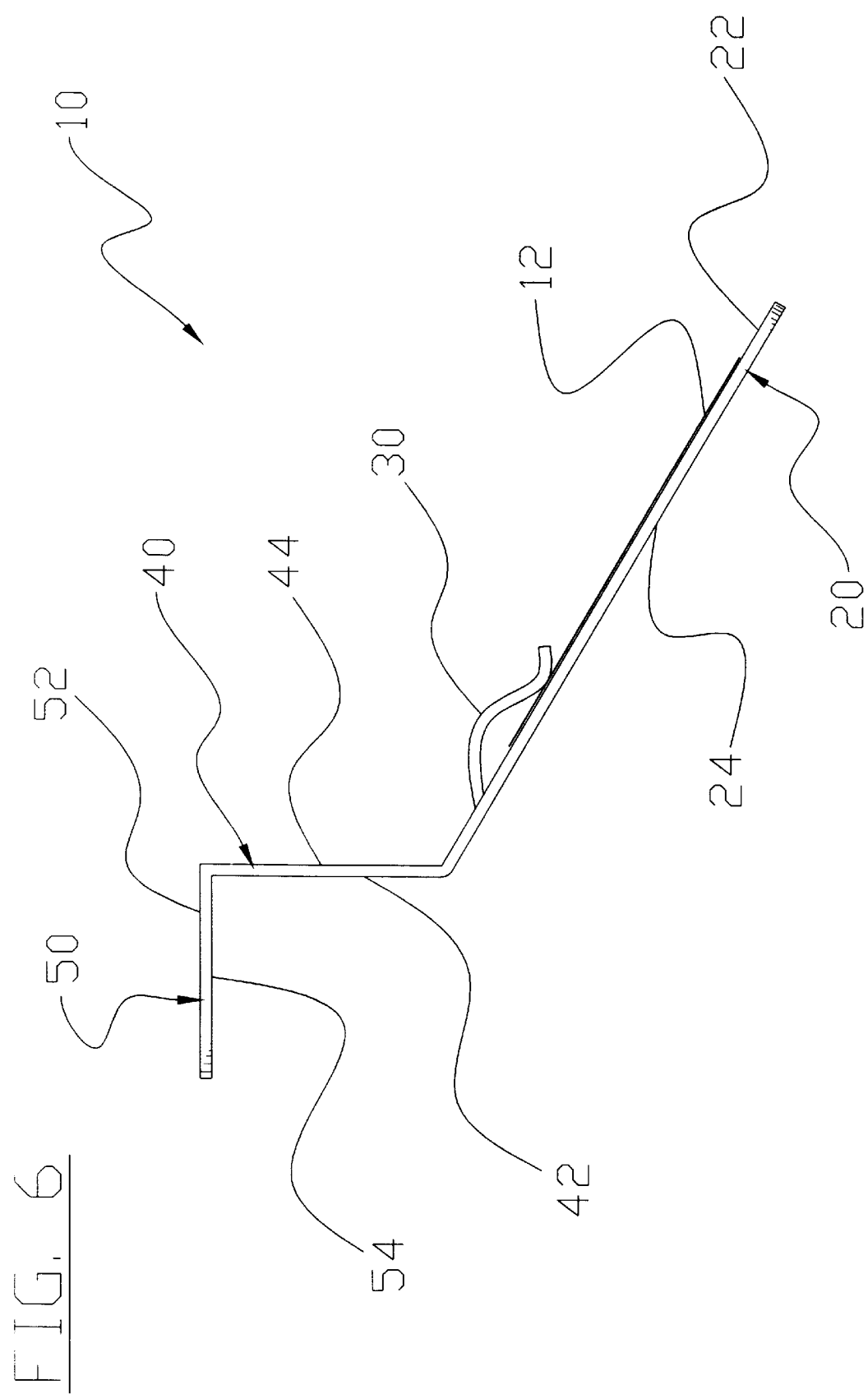
FIG. 6 is a side view of the present invention.

A shown in FIGS. 1 through 8 of the drawings, a clip member 30 is attached to an upper segment of the upper surface 22 of the main body 20 adjacent the upper edge thereof. The clip member 30 is preferably comprised of a resilient S-shaped structure as best shown in FIG. 6 of the drawings. One end of the clip member 30 is attached to the upper surface 22 with the opposing distal end of the clip member 30 free to be elevated upwardly for allowing insertion of the recipe 12 between the clip member 30 and the upper surface 22 of the main body 20. The distal end of the clip member 30 preferably is curved upwardly away from the upper surface 22 for allowing easy grasping by the user and insertion of the recipe 12.

As shown in FIGS. 1 through 7 of the drawings, a vertical member 40 is attached to the upper end of the main body 20. The vertical member 40 preferably has a width similar to the width of the main body 20. The vertical member 40 extends upwardly from the upper end of the main body 20 with an obtuse angle between the vertical member 40 and the main body 20 as best shown in FIG. 6 of the drawings. The height of the vertical member 40 is preferably smaller than the height of the front lip 16 of the cabinet 14 as shown in FIG. 5 of the drawings. The vertical member 40 is preferably flat in structure similar to the main body 20 as further shown in FIG. 6 of the drawings.

The vertical member 40 has a first side 42 and a second side 44 as shown in FIG. 6 of the drawings. The first side 42 of the vertical member 40 is positioned adjacent the front lip 16 of the cabinet 14 when positioned upon the cabinet 14 as shown in FIG. 5 of the drawings. With cabinets 14 where the door 18 engages the front surface of the front lip 16, the second side 44 of the vertical member 40 is engaged by the door 18.

As shown in FIGS. 1, 2, 6 and 8 of the drawings, a horizontal member 50 is attached to the distal portion of the vertical member 40 opposite of the main body 20. The horizontal member 50 has an upper portion 52 and a lower portion 54, wherein the lower portion 54 engages the top surface of the front lip 16.

The horizontal member 50 preferably has a width similar to the vertical member 40 and the main body 20. The horizontal member 50 preferably extends orthogonally from the vertical member 40 as best shown in FIG. 6 of the drawings. The horizontal member 50 is a flat structure sufficient to allow insertion of the horizontal member 50 beneath the door 18 of the cabinet 14. The horizontal member 50 preferably has a length greater than the width of the door 18 as shown in FIG. 5 of the drawings.

In use, the user opens the door 18 of the cabinet 14 and positions the recipe holder system 10 so that the vertical member 40 is adjacent the front surface of the front lip 16 and the horizontal member 50 is positioned adjacent to the top surface of the front lip 16. The user then closes the door 18 while simultaneously supporting the recipe holder system 10 in the desired position. Depending upon the style of the cabinet 14, the lower edge of the door 18 may engage the upper portion 52 of the horizontal member 50 or the inner surface of the lower edge of the door 18 may engage the second side 44 of the vertical member 40 as shown in FIGS. 5 and 9 respectively. The door 18 retains the recipe holder system 10 in the desired position with the main body 20 extending outwardly and slightly downwardly as best shown in FIG. 5 of the drawings. The user then grasps the distal portion of the clip member 30 and elevates the distal portion thereof. The recipe 12 is then inserted between the clip member 30 and upon the upper surface 22 of the main body 20. The clip member 30 is then lowered upon the recipe 12 thereby frictionally retaining the recipe 12 upon the upper surface 22 of the main body 20. When the user is finished, they simply remove the recipe 12 from the clip member 30 and then open the door 18 to allow remove of the recipe 12 holder system. Once the recipe holder system 10 is removed from the cabinet 14, the door 18 is then closed and the recipe holder system 10 positioned within a compact storage location such as a recipe box.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A recipe holder system removably attachable between a cabinet front lip and a lower edge of a cabinet door for supporting a recipe document, comprising:

a main body having an upper surface, a lower surface, an upper end and a lower end;

a vertical member having a first side and a second side, wherein said vertical member extends from said upper end of said main body at an obtuse angle;

a horizontal member having an upper portion and a lower portion, wherein said horizontal member extends orthogonally from a distal end of said vertical member and away from said main body; and a clip member attached within said upper surface of said main body near said vertical member, for holding a recipe document substantially parallel against said main body.

2. The recipe holder system of claim 1, wherein said main body, said vertical member and said horizontal member are comprised of a flat structure.

3. The recipe holder system of claim 1, wherein said main body, said vertical member and said horizontal member are comprised of a broad and solid structure.

4. The recipe holder system of claim 1, wherein said main body, said vertical member and said horizontal member have an equal width.

5. The recipe holder system of claim 1, wherein said main body is comprised of a rectangular shape.

6. The recipe holder system of claim 1, wherein said clip member is comprised of an S-shaped structure with a first end and a second end, wherein said first end is secured to said upper surface of said main body.

7. The recipe holder system of claim 1, wherein said second end is curved upwardly with respect to said upper surface of said main body.

8. The recipe holder system of claim 1, wherein said main body, said vertical member and said horizontal member are comprised of a lightweight material.

9. The recipe holder system of claim 1, wherein a width of said horizontal member is greater than a length of said horizontal member.

10. The recipe holder system of claim 1, wherein said vertical member has a height greater than a length of said horizontal member.

11. A recipe holder system removably attachable between a cabinet front lip and a lower edge of a cabinet door for supporting a recipe document, comprising:

a main body having an upper surface, a lower surface, an upper end and a lower end;

a vertical member having a first side and a second side, wherein said vertical member extends from said upper end of said main body;

a horizontal member having an upper portion and a lower portion, wherein said horizontal member extends orthogonally from a distal end of said vertical member and away from said main body; and a clip member attached to said upper surface of said main body near said vertical member.

12. The recipe holder system of claim 11, wherein said main body, said vertical member and said horizontal member are comprised of a flat structure.

13. The recipe holder system of claim 11, wherein said main body, said vertical member and said horizontal member are comprised of a broad and solid structure.

14. The recipe holder system of claim 11, wherein said main body, said vertical member and said horizontal member have an equal width.

15. The recipe holder system of claim 11, wherein said main body is comprised of a rectangular shape.

16. The recipe holder system of claim 11, wherein said clip member is comprised of an S-shaped structure with a first end and a second end, wherein said first end is secured to said upper surface of said main body.

17. The recipe holder system of claim 11, wherein said second end is curved upwardly with respect to said upper surface of said main body.

18. The recipe holder system of claim 11, wherein said main body, said vertical member and said horizontal member are comprised of a lightweight material.

19. The recipe holder system of claim 11, wherein a width of said horizontal member is greater than a length of said horizontal member.

20. The recipe holder system of claim 11, wherein said vertical member has a height greater than a length of said horizontal member.

* * * * *